Patented July 16, 1935

2,008,601

UNITED STATES PATENT OFFICE 2,008,601

CHROMIFEROUS AZO-DYESTUFFS AND PROCESS OF MAKING SAME

Fritz Straub, Basel, and Hermann Schneider, Riehen, near Basel, Switzerland, assignors to Society of Chemical Industry in Basle, Basel, Switzerland No Drawing. Application March 19, 1934, Serial No. 716,426. In Switzerland March 31, 1933

12 Claims. (Cl. 260—12)

The present invention relates to chromiferous azo-dyestuffs. It comprises the process of making these dyestuffs as well as the new products themselves.

It has been found that chromiferous azo-dyestuffs are obtained by causing alkaline agents to react under energetic conditions on chromium compounds of azo-dyestuffs of the general formula

wherein $R_1$ means a sulfonated naphthalene radical and $R_2$ a naphthol radical, and wherein the hydroxyl group of the naphthalene radical $R_1$ stands in ortho-position to the azo-bridge, and which chromium compounds contain at least one atom of chromium for each chromable group of the dyestuff molecule.

For making the parent materials for the invention, namely the said chromium compounds, there may be used the azo-dyestuffs from, for example, diazotized 1-amino-2-hydroxynaphthalene-4-sulfonic acid, diazotized 2-amino-1-hydroxynaphthalene-4-sulfonic acid, diazotized 2-amino-1-hydroxynaphthalene-4,8-disulfonic acid, diazotized chloro- or bromo-1-amino-2-hydroxynaphthalene-4-sulfonic acid, and 1- or 2-hydroxynaphthalene or substitution products thereof, for instance, chloro-, bromo-, methyl- or alkoxy-hydroxynaphthalenes.

The chromium compounds of the azo-dyestuffs of the above formula containing at least one atom of chromium for each chromable group in the dyestuff molecule may be made by any of the known processes and with various chroming agents; such processes are, for example, chroming with an agent yielding chromium in acid, neutral or alkaline medium in an open vessel or under pressure, in presence or absence of suitable additions such as an organic acid or an inorganic acid or a soluble salt thereof or some other substance, for instance, an organic solvent.

Alkaline agents suitable for treating the chromed dyestuff under energetic conditions may be, for example, sodium carbonate, potassium carbonate, borax, magnesium oxide, calcium hydroxide, ammonia, trialkali metal-phosphate, caustic alkali such as potassium hydroxide or sodium hydroxide or organic bases; these alkaline agents may be used either alone or mixed with each other.

Particularly good results, in respect of the dyeing properties of the chromiferous azo-dyestuffs made by the invention, are obtained when caustic akalies are used. The chromed azo-dyestuff may be treated in a separated condition but it is also possible to treat the mixture in which the reaction producing the chromium compound occurs. By treating the chromium compounds of the azo-dyestuff of the above formula which contain at least one atom of chromium for each chromable group of the dyestuff, with alkaline agents in accordance with this invention a part of the chromium held in the dyestuff in complex combination is separated so that the chromed azo-dyestuff produced contains less chromium than one atom for each chromable group in a dyestuff molecule. In order to achieve this the treatment with the alkaline agent must occur under energetic conditions, for instance, prolonged heating or boiling in an open vessel or under pressure and by suitable choice of the akaline agent and the concentration of the alkali. The energetic conditions may be varied considerably; they are, in particular, dependent on the strength of the union of the chromium in the complex combination with the azo-dyestuffs, the chromium compound of which constitutes the parent material.

The chromium compounds produced by this invention are characterized by very good solubility in water and are suitable for dyeing animal fibers such as wool and silk. In dyeing wool they may be applied with advantage in the manner described in Patent No. 1,903,884 or by using dyebaths containing an aromatic acid besides an inorganic acid. The new dyestuffs dye navy blue but when contrasted with similarly dyeing dyestuffs of this group they are found to produce uniform dyeings in deep tones which are fast in every respect. The dyeings are particularly fast to rubbing and show a very good color in the artificial light.

The following examples illustrate the invention, the parts being by weight:—

Example 1

41.6 parts of the azo-dyestuff of the formula

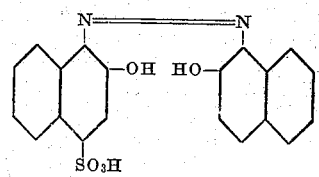

from diazotized 1-amino-2-hydroxynaphthalene-4-sulfonic acid and 2-hydroxynaphthalene are suspended whilst stirring in 1000 parts of water, chromium formate corresponding with 8.4 parts of $Cr_2O_3$ is added and the mixture is boiled for 10–12 hours in a reflux apparatus.

To the mixture there are then added 133 parts of caustic soda solution of 30 per cent strength whereby the undissolved chromium compound dissolves in the form of a red-violet solution; this is boiled in a reflux apparatus for 8 hours. The solution, which has become blue-violet, is cooled and neutralized with hydrochloric acid of 10 per cent strength and then acidified with 3 parts of formic acid. After filtration from impurities the new chromiferous dyestuff is salted out from the filtrate.

When dry it is a violet-black powder soluble in water to a blue solution having red dichroism. It also dissolves sparingly in sodium carbonate solution of 10 per cent strength to blue solution and in caustic soda solution of 10 percent strength very sparingly to a violet-red solution; in concentrated sulfuric acid it dissolves to a blue solution. It dyes wool in an acid bath navy blue tints of excellent fastness.

A chromed dyestuff with the same properties is obtained if the parent chromed azo-dyestuff is separated from the mixture in which it is made and then treated with caustic soda lye.

*Example 2*

41.6 parts of the azo-dyestuff from diazotized 1-amino-2-hydroxynaphthalene-4-sulfonic acid and 2-hydroxynaphthalene are chromed in the following manner:—

In an iron vessel 41 parts of caustic soda are dissolved at 60–70° C. in 80 parts of an aqueous chromium hydroxide paste containing 7.6 parts of $Cr_2O_3$; the solution is mixed with 15 parts of 2-hydroxynaphthalene and cooled to 15° C.; there are then added 27.3 parts of diazotized 1-amino-2-hydroxynaphthalene-4-sulfonic acid and the mixture is heated at 40° C. until the diazo-compound has disappeared. The whole is now heated to 70–75° C. at which temperature it is maintained until the dyestuff has been completely converted into its chromium compound.

The mass is now diluted with water to make 1200 parts by volume and then boiled for 30 hours in a reflux apparatus, the solution, which was at first red-violet, becomes blue-violet. After cooling to about 50° C. the mass is neutralized with hydrochloric acid of 10 per cent strength and then acidified in 3 parts of formic acid and after filtration of insoluble matter and chromium hydroxide, which has separated, the chromed dyestuff is salted out.

There is produced a violet-black powder which is soluble in water to a blue solution having red dichroism, it also dissolves in sodium carbonate solution of 10 per cent strength to a blue solution, in caustic soda solution of 10 per cent strength very sparingly to a red-violet solution and in concentrated sulfuric acid to a blue solution. It dyes wool in an acid bath navy blue tints of very good fastness.

Similar results are obtained if the chromed dyestuff used as the parent material is separated, then dissolved in dilute caustic soda lye and the solution boiled for several hours.

*Example 3*

41.6 parts of the azo-dyestuff of the formula

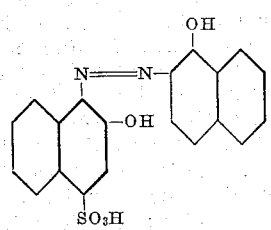

from diazotized 1-amino-2-hydroxynaphthalene-4-sulfonic acid and 1-hydroxynaphthalene are chromed in manner similar to that described in Example 2.

Instead of caustic soda solution, caustic potash solution may be used.

When chroming is completed the mass is diluted with 1000 parts of water and then boiled for 6–8 hours in a reflux apparatus. After cooling to 50–60° C. the mass is neutralized with hydrochloric acid of 10 per cent strength then acidified with 3 parts of acetic acid filtered from insoluble matter and evaporated to dryness in a vacuum.

The new chromium compound is a violet-black powder soluble in water to a blue solution having red-violet dichroism, it also dissolves sparingly in sodium carbonate solution of 10 per cent strength to a blue solution, in caustic soda lye of 10 per cent strength very sparingly to a red-violet solution and in concentrated sulfuric acid to a blackish green solution. It dyes wool in an acid bath navy blue tints of very good fastness.

*Example 4*

40 parts of a chromium compound, produced in alkaline medium from the azo-dyestuff from diazotized 1-amino-2-hydroxynaphthalene-4-sulfonic acid and 2-hydroxynaphthalene which contains at least one atom of chromium per chromable group of the dyestuff molecule, are heated together with a solution of 80 parts of trisodiumphosphate in 800 parts of water for 4 hours at 125–130° C. The mixture is filtered while hot, the residue on the filtrate is extracted by means of hot water and from the combined filtrate and extract the dyestuff is salted out. The chromiferous azo-dyestuff thus obtained is a violet-black powder freely soluble in water and in sodium carbonate solution of 10 per cent strength to a blue solution showing red dichroism, caustic soda solution of 10 per cent strength dissolves to a violet solution and concentrated sulfuric acid dissolves to a blue solution. It dyes wool in a bath acid with organic acid and sulfuric acid dark navy blue tints which are very fast, particularly to rubbing, and are excellent artificial light covers.

*Example 5*

60 parts of the chromium compound of the azo-dyestuff from diazotized 1-amino-2-hydroxynaphthalene-4-sulfonic acid and 1-hydroxynaphthalene, which contains at least one atom of chromium for each chromable group in the dyestuff molecule, are introduced into 500 parts of water after addition of 200 parts of ammonia of 20 per cent strength, the whole is heated for 5 hours to 125–130° C. After the excess of ammonia has been expelled the blue solution thus obtained is filtered, whilst still hot, from impurities which are washed with hot water and the filtrate is evaporated in a vacuum to dryness, there is obtained a violet-black powder easily soluble in water and in sodium carbonate solution of 10 per cent strength to blue, red dichroic solutions, caustic soda solution of 10 per cent strength dissolves the dyestuff to a blue-violet solution whilst in concentrated sulfuric acid it dissolves to a greenish black solution. It dyes wool in a bath acid with organic acid and sulfuric acid blue to navy blue tints which are very fast.

*Example 6*

40 parts of a chromium compound produced in alkaline medium of the azo-dyestuff from diazotized 1-amino-2-hydroxynaphthalene-4-sulfonic acid and 2-hydroxynaphthalene, which contains at least one atom of chromium for each chromable group of the dyestuff molecule, are introduced into 800 parts of a milk of lime which contains 30 parts of calcium oxide and the whole is heated for 4–5 hours to 120–130° C. The suspension thus obtained is filtered, cooled, extracted with dilute hydrochloric acid, washed free from lime by means of common salt solution, dissolved in water and filtered. From the filtrate a new chromiferous dyestuff is salted out. After filtration and drying it is a violet-black powder which dissolves easily in water and in sodium carbonate solution of 10 per cent strength to blue solution. Caustic soda solution of 10 per cent strength dissolves into a violet solution and concentrated sulfuric acid to a blue solution. It dyes wool in a bath acid with organic acid and sulfuric acid dark navy blue tints of very good fastness.

Similar results are obtained if the chromium compound made in acid medium is used as the parent material.

Example 7

18 parts of a chromium compound of the azo-dyestuff from diazotized 1-amino-2-hydroxynaphthalene-4-sulfonic acid and 1-hydroxynaphthalene which is obtained by heating, for 8 hours, the unchromed dyestuff, in a concentrated potassium chromite solution at 74–78° C., and contains at least one chromium atom per chromable group of the dyestuff molecule, are mixed with 10 parts of magnesia suspended in 400 parts of water and the mixture is boiled whilst stirring for 40–50 hours in a reflux apparatus. There is produced a blackish blue solution which is filtered from the small quantity of impurities, the filtrate is made slightly acid to litmus by addition of acetic acid and then evaporated to dryness in a vacuum. The chromiferous dyestuff thus obtained is a violet black, powder soluble in water, sodium carbonate solution of 10 per cent strength and caustic soda solution of 10 per cent strength to blue solutions, in concentrated sulfuric acid it dissolves to a blue-grey solution. It dyes wool in a bath acid with organic acid and sulfuric acid blue to navy blue tints of very good fastness.

Example 8

15 parts of a chromium compound of the azo-dyestuff from diazotized 1-amino-2-hydroxynaphthalene-4-sulfonic acid and 2-hydroxynaphthalene which has been made by heating the dyestuff for 7 hours in a concentrated potassium chromite solution at 75–80° C. and contains at least one atom of chromium per chromable group of the dyestuff molecule, are suspended in 500 parts of water, 20 parts of borax are added and the whole is heated for 40–50 hours whilst stirring in a reflux apparatus. The new solution thus produced is filtered, the residue is washed with hot water and the filtrate is neutralized with dilute acetic acid and then evaporated to dryness. The new chromiferous dyestuff is thus obtained in the form of a violet-black powder which dissolves easily in water to a blue solution showing red dichroism, in sodium carbonate solution of 10 per cent strength to a blue-violet solution and in caustic soda solution of 10 per cent strength to a violet solution, concentrated sulfuric acid dissolves it to a blackish blue solution. It dyes wool in a bath acid with organic acid and sulfuric acid navy blue tints of very good fastness.

Example 9

6 parts of a chromium compound, produced in acid medium from the azo-dyestuff of the formula

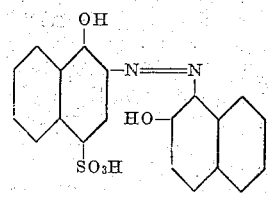

from diazotized 2-amino-1-hydroxynaphthalene-4-sulfonic acid and 2-hydroxynaphthalene, which contains at least one atom of chromium for each chromable group of the dyestuff molecule, are introduced into a milk of lime made from 10 parts of calcium oxide and 300 parts of water and the mixture is boiled whilst stirring in a reflux apparatus for five hours. The suspension thus produced is filtered, freed from lime by digestion with strongly dilute hydrochloric acid and washing with common salt solution, then dissolved in water, the solution filtered and the dyestuff salted out from the filtrate, it is a bluish black powder soluble in water, sodium carbonate solution of 10 per cent strength and caustic soda solution of 10 per cent strength to blue-violet solutions having red dichroism. Concentrated sulfuric acid dissolves it to a blue solution. It dyes wool in a bath acid with organic acid and sulfuric acid reddish blue tints of very good fastness.

Example 10

30 parts of a chromium compound, produced in acid medium from the dyestuff from 1-amino-2-hydroxynaphthalene-4-sulfonic acid and 2-hydroxynaphthalene, which contains at least one atom of chromium for each chromable group of the dyestuff molecule, are suspended in 800 parts of water, 30 parts of potassium carbonate are added and the whole is then heated for 5 hours to 125–130° C. The blue solution thus obtained is filtered from the small quantity of impurities, neutralized with strongly diluted hydrochloric acid and evaporated to dryness. The new chromiferous dyestuff is thus obtained in the form of a bluish black powder which dissolves easily in water to a blue solution having red dichroism, in sodium carbonate solution of 10 per cent strength it dissolves to a reddish blue solution and in caustic soda solution of 10 per cent strength to a violet solution, while in concentrated sulfuric acid it dissolves to a blue solution. The dyestuff dyes wool in a bath acid with organic acid and sulfuric acid dark navy blue tints which, in comparison with the dyeings obtained from the parent dyestuff, are improved artificial light colors and have a better fastness to rubbing.

Example 11

6 parts of a chromium compound obtained by boiling for several hours with chromium formate with the azo-dyestuff from diazotized 2-amino-1-hydroxynaphthalene-4-sulfonic acid and 2-hydroxynaphthalene and containing at least one atom of chromium per chromable group of the dyestuff molecule, are dissolved in 300 parts of water together with 20 parts of potassium carbonate and the solution is boiled in a reflux apparatus for 40–50 hours. The red-violet solution thus obtained is filtered, the filtrate is neutralized with strongly diluted hydrochloric acid and the dyestuff is then salted out. It is a violet-black powder which dissolves easily to a blue-violet solution having red dichroism in water. In sodium carbonate solution of 10 per cent strength and in caustic soda solution of 10 per cent strength it dissolves to reddish violet solutions and in concentrated sulfuric acid to a blackish blue-green solution. It dyes wool in a bath acid with organic acid and sulfuric acid blue tints of very good fastness.

What we claim is:—

1. A process for the manufacture of chomiferous azo-dyestuffs, consisting in boiling with alkaline media for at least four hours chromium compounds of azo-dyestuffs of the general formula

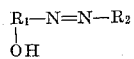

wherein $R_1$ means a sulfonated napthalene radical, and $R_2$ a naphthol radical, and wherein the hydroxyl group of the naphthalene radical $R_1$ stands in ortho-position to the azo-bridge, and which chromium compounds contain at least one atom of chromium for each chromable group of the dyestuff molecule.

2. A process for the manufacture of chromiferous azo-dyestuffs, consisting in boiling with alkaline media for at least four hours chromium compounds of azo-dyestuffs of the general formula

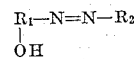

wherein $R_1$ means an unsubstituted sulfonated naphthalene radical, and $R_2$ a naphthol radical, and wherein the hydroxyl group of the naphthalene radical $R_1$ stands in ortho-position to the azo-bridge, and which chromium compounds contain at least one atom of chromium for each chromable group of the dyestuff molecule.

3. A process for the manufacture of chromiferous azo-dyestuffs, consisting in boiling with alkaline media for at least four hours chromium compounds of azo-dyestuffs of the general formula

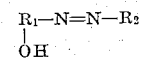

wherein $R_1$ means an unsubstituted sulfonated naphthalene radical and $R_2$ a naphthol radical, and wherein the hydroxl group of the naphthalene radical $R_1$ stands in ortho-position to the azo-bridge, and which chromium compounds contain at least one atom of chromium for each chromable group of the dyestuff molecule.

4. A process for the manufacture of chromiferous azo-dyestuffs, consisting in boiling with alkaline media for at least four hours chromium compounds of azo-dyestuffs of the general formula

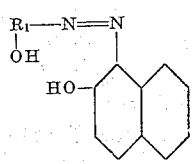

wherein $R_1$ means an unsubstituted sulfonated naphthalene radical and wherein the two hydroxyl groups stand in ortho-position to the azo-bridge, and which chromium compounds contain at least one atom of chromium for each chromable group of the dyestuff molecule.

5. A process for the manufacture of chromiferous azo-dyestuffs, consisting in boiling with alkaline media for at least four hours chromium compounds of azo-dyestuffs of the formula

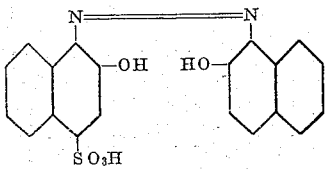

which chromium compounds contain at least one atom of chromium for each chromable group of the dyestuff molecule.

6. A process for the manufacture of chromiferous azo-dyestuffs, consisting in boiling with caustic soda solution for at least four hours chromium compounds of azo-dyestuffs of the formula

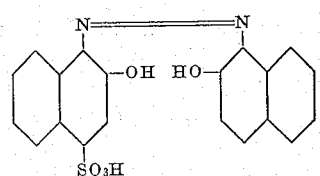

which chromium compounds contain at least one atom of chromium for each chromable group of the dyestuff molecule.

7. Chromiferous azo-dyestuffs obtained by boiling with alkaline media for at least four hours chromium compounds of azo-dyestuffs of the general formula

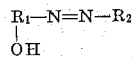

wherein $R_1$ means a sulfonated naphthalene radical, and $R_2$ a naphthol radical, and wherein the hydroxyl group of the naphthalene radical $R_1$ stands in ortho-position to the azo-bridge, and which chromium compounds contain at least one atom of chromium for each chromable group of the dyestuff molecule, which chromiferous azo-dyestuffs represent blue-black to violet-black powders easily soluble in water to blue to blue-violet solutions, and dye wool in the acid bath very fast blue to navy blue tints which are particularly fast to rubbing.

8. Chromiferous azo-dyestuffs obtained by boiling with alkaline media for at least four hours chromium compounds of azo-dyestuffs of the general formula

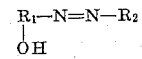

wherein $R_1$ means an unsubstituted sulfonated naphthalene radical, and $R_2$ a naphthol radical, and wherein the hydroxyl group of the naphthalene radical $R_1$ stands in ortho-position to the azo-bridge, and which chromium compounds contain at least one atom of chromium for each chromable group of the dyestuff molecule, which chromiferous azo-dyestuffs represent blue-black to violet-black powders easily soluble in water to blue to blue-violet solutions, and dye wool in the acid bath very fast blue to navy blue tints which are particularly fast to rubbing.

9. Chromiferous azo-dyestuffs, obtained by boiling with caustic alkaline media for at least four hours chromium compounds of azo-dyestuffs of the general formula

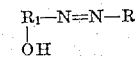

wherein $R_1$ means an unsubstituted sulfonated naphthalene radical, and $R_2$ a naphthol radical, and wherein the hydroxyl group of the naphthalene radical R₁ stands in ortho-position to the azo-bridge, and which chromium compounds contain at least one atom of chromium for each chromable group of the dyestuff molecule, which chromiferous azo-dyestuffs represent blue-black to violet-black powders easily soluble in water to blue to blue-violet solutions, and dye wool in the acid bath very fast blue to navy blue tints which are particularly fast to rubbing.

10. Chromiferous azo-dyestuffs, obtained by boiling with caustic alkaline media for at least four hours chromium compounds of azo-dyestuffs of the general formula

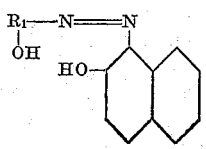

wherein R₁ means an unsubstituted sulfonated naphthalene radical and wherein the two hydroxyl groups stand in ortho-position to the azo-bridge, and which chromium compounds contain at least one atom of chromium for each chromable group of the dyestuff molecule, which chromiferous azo-dyestuffs represent blue-black to violet-black powders easily soluble in water to blue to blue-violet solutions, and dye wool in the acid bath very fast blue to navy blue tints which are particularly fast to rubbing.

11. Chromiferous azo-dyestuffs, obtained by boiling with caustic alkaline media for at least four hours chromium compounds of azo-dyestuffs of the formula

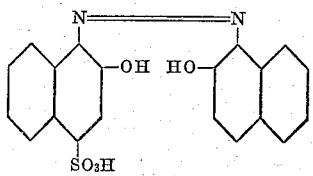

which chromium compounds contain at least one atom of chromium for each chromable group of the dyestuff molecule, which chromiferous azo-dyestuffs represent blue-black to violet-black powders easily soluble in water to blue to blue-violet solutions, and dye wool in the acid bath very fast blue to navy blue tints which are particularly fast to rubbing.

12. Chromiferous azo-dyestuffs, obtained by boiling with caustic soda solution for at least four hours the chromium compounds of azo-dyestuffs of the formula

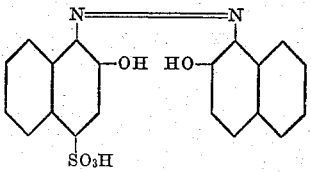

which chromium compounds contain at least one atom of chromium for each chromable group of the dyestuff molecule, which chromiferous azo-dyestuffs represent blue-black to violet-black powders easily soluble in water to blue to blue-violet solutions, and dye wool in the acid bath very fast blue to navy blue tints which are particularly fast to rubbing.

FRITZ STRAUB.
HERMANN SCHNEIDER.